June 13, 1972  A. S. TUCKER  3,669,598
APPARATUS FOR MOLDING AND EJECTING PLASTIC ARTICLES
Filed Nov. 26, 1969  3 Sheets-Sheet 1

INVENTOR.
A. S. TUCKER
BY Young & Quigg

ATTORNEYS

June 13, 1972   A. S. TUCKER   3,669,598
APPARATUS FOR MOLDING AND EJECTING PLASTIC ARTICLES
Filed Nov. 26, 1969   3 Sheets-Sheet 3
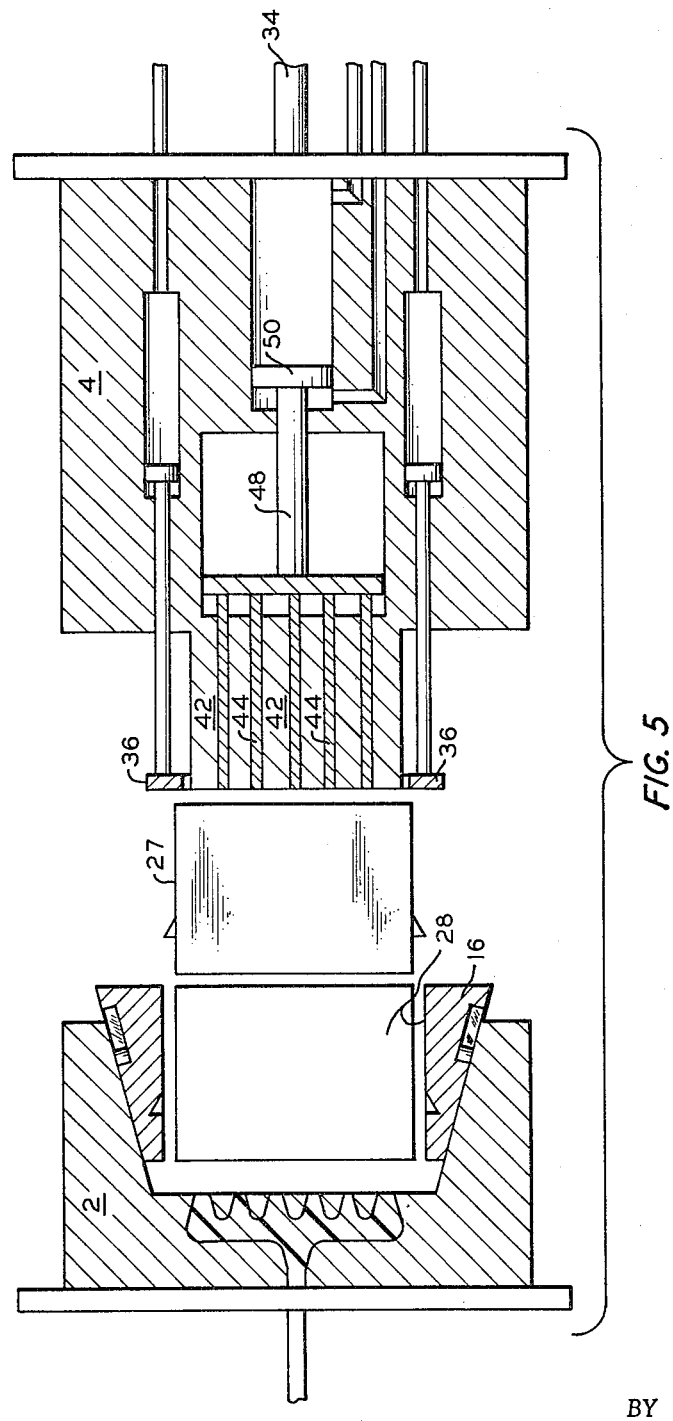
INVENTOR.
A. S. TUCKER
BY Young & Quigg
ATTORNEYS

United States Patent Office 3,669,598
Patented June 13, 1972

3,669,598
APPARATUS FOR MOLDING AND EJECTING
PLASTIC ARTICLES
Alvin S. Tucker, Bartlett, Ill., assignor to
Phillips Petroleum Company
Filed Nov. 26, 1969, Ser. No. 880,341
Int. Cl. B29f 1/00, 1/14
U.S. Cl. 425—249                                    7 Claims

ABSTRACT OF THE DISCLOSURE

Method and apparatus for molding and ejecting plastic articles having protrusions extending from a base of the article. Movable blades between the core elements assure proper filling of the mold and function to eject the molded articles from the mold core section.

---

Figure 1:
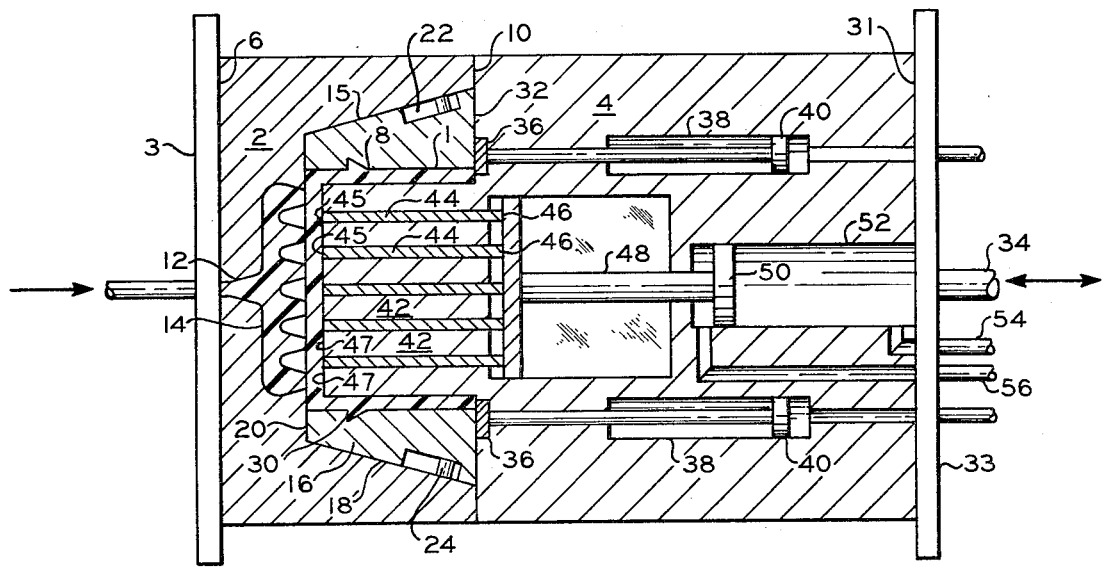

This invention relates to an improved apparatus and method for molding and ejecting plastic articles from said apparatus. In another aspect, this invention relates to an improved apparatus and method for molding and ejecting plastic articles having protrusions extending from a base of the article.

In the molding of articles having protrusions extending from a base of the article, it is difficult to assure that the molding material completely fills the mold. This problem is further increased when the protrusions are thin walled protrusions associated with thick walled portions such as for example a divided container. It is also often difficult to eject such articles from the mold. A large draft on portions of the molded article facilitates separation, but often a container is desired that has little or no draft.

It is therefore an object of this invention to provide an improved apparatus and method for molding articles. Another object of this invention is to provide an improved apparatus and method for molding plastic articles and ejecting articles from the mold. A further object of this invention is to provide a method and apparatus for molding and ejecting plastic articles having substantially no draft. Other aspects, objects, and advantages of the present invention will become apparent from a study of the disclosure, the appended claims, and the drawing.

The drawings which comprise five figures are schematic diagrams in partial cross section showing the mold and associated elements of this invention at various operating positions during opening of the mold for ejection of the molded article.

Referring to FIG. 1, a separable injection mold having a mold cavity section 2 and a mold core section 4 are shown in the first or closed position for molding an article 1. The mold cavity section 2 has a mounting surface 6 fixed to a stationary mounting platen 3 to maintain said mold section 2 in a fixed position relative to the mold core section 4. The mold cavity section 2 has a cavity 8 formed therethrough opening on the parting surface 10. A sprue 12 extends through the first end portion of the mold cavity section 2, is connected on one end to a plastic material injection machine (not shown) and on the other end to a plurality of runners 14 opening into the cavity of the mold cavity 8 for injecting plastic molding material.

Holding means, for example tulips 16, forming a portion of cavity 8, are sealably and slidably positioned within an opening of the mold cavity section 2 for movement between an article-holding position (shown) wherein the outer surface 18 and the first end 20 of the tulips 16 are in sealable contact with portions of the mold cavity section 2 and an article-releasing position (better seen in FIG. 4) wherein the first end 20 of the tulips 16 is moved outwardly from the first position in the mold cavity section 2. Tulips 16 are wedge-shaped fittings within the opening of mold cavity section 2 having their smaller end mounted toward the mounting surface 6 and their larger ends terminating along parting surface 10. Means for restricting movement of the tulips 16, for example a slot 22 formed on the tulips 16, and a stop-bar 24 on the mold cavity section 2 within the slot 22, or the like, are provided to terminate movement of the tulips 16 with the molded article 1 at the article-releasing position and maintain a portion of the tulips 16 within the cavity 8. A tulip cavity surface 28 (better seen in FIG. 5) having any desired configuration is provided to form the outer surface 27 of the molded article 1. The tulips 16 must, however, be sufficiently movable relative to the mold cavity 8 so that at the article-release position of said tulips the molded article 1 can be extracted from said tulips 16. The tulip cavity surface 28 of this invention must also have a holding means 30 (to be more fully described), for example a groove, to prevent removal of the article 1 during certain operations of the ejection of the molded article 1.

Mold core section 4 has a mounting surface 31 fixed to a reciprocably movable mounting platen 33. In the first position, a parting surface 32 of the mold core section 4 (better seen in FIG. 2) is sealably abutting the parting surface 10 of the mold cavity section 2. A shaft 34, or other power transmission means, is attached to the platen 33 for movement of said mold core section 4 from the first or mold-closed position (shown) to a second or mold-open position spaced from the mold cavity section 2 (to be later more fully described). In order to facilitate stripping of the molded article 1 from the mold core section 4, a stripping ring 36 can be movably mounted on the mold core section 4 in contact with the molded article 1, core elements 42, and the tulips 16 at the first position and movable toward the tulips 16 during movement of the mold core section 4 away from the tulips 16 as said mold element 4 moves toward the second position. At least one power system, preferably more than one power system, can be connected to the stripping element 36 for movement of said stripping element 36 relative to the mold core section 4. It is desired that a plurality of power systems be connected with the stripping element 36 to exert a more equal pressure on the stripping element and maintain uniform movement of the stripping element 36. It is also preferred that the power systems associated with the stripping element 36 be conventional hydraulic systems having cylinders 38 associated with the mold core section 4 and pistons 40 positioned within the cylinders 38. Hydraulic systems are preferred to provide a power system that is compact and easily adjustable to maintain the relative travel rates of the elements of this invention.

At least two individual core elements 42 are fixedly attached or fused on the mold core section 4. The molded article 1 can comprise a multitude of hollowed portions defining divider members 41 within article 1. This construction requires a multitude of core elements 42 spaced one from the other. In the first position of the mold core section, the core elements 42 are positioned within the mold cavity section 2 at which position the plastic article 1 is molded and at the second position the core elements 42 are spaced a distance from said mold cavity section 2 and the molded article 1 is ejected.

At least one core blade 44 having a first and second end 45, 46 is sealably positioned between adjacent core elements 42. The blade 44 is movable between a first position at which a first end portion is adjacent and separating first ends of the core elements 42 and a second end position at which the first end portion and first end of the blade is spaced a distance from the first end 47 of the core elements 42. An actuating rod 48 is connected to the second end 46 of the blade 44 and to a piston 50 that is positioned within a cylinder 52 to form a fluid actuated, double acting cylinder means. The cylinder 52 is connected to a power source (not shown) by first and second conduits 54, 56 for movement of fluid between the cylinder 52 and the power source for moving the blades 44 in response to moving the piston 50 from the first to a second position while forming the molded article 1 and from the second to the first position for ejecting the molded article 1 from the injection mold. It should be understood that where it is desired to form a plurality of protrusions extending from a base of an article 1, there can be more than two core elements 42 with a separate blade 44 postioned between adjacent core elements 42.

The fluid actuated, double acting cylinder means 52 preferably functions to move the blades 44 from the first to the second position at a uniform rate with said movement being initiated at a predetermined moment subsequent to forming a portion of the molded article 1 within the injection mold. It is also preferred that the cylinder means 52 is hydraulically actuated, urges the blades 44 toward the mold cavity section 2 during movement from the first to the second position, and moves the blades 44 from the second to the first position in contact with the molded article 1 during movement of the mold core section 4 from the first to the second position for ejecting the article 1.

By moving the blades 44 at a controlled rate from the first to the second position, as described above, the larger portions of the cavity 8 of the mold can be filled and thereafter the cavities accompanying the blades 44 can be assured of filling to capacity. Where all cavities are attempted to be filled simultaneously, the molding material more easily flows to the larger cavity portions first and causes higher pressures to be needed to fill the lower capacity portions of the cavity. Thereafter withdrawing the blades 44 at a uniform rate while urging the blades toward the plastic material assures subsequent proper filling of the lower capacity cavity portions by holding pressure against the molding material and eliminating the necessity to compress air within the cavity during filling of these lower capacity cavity portions. Where movable blades 44 are not used, the molding material flows erratically into the lower capacity portions and traps air therein which causes undesirable bubbles and voids to be formed within the molded article 1. By utilizing hydraulic means, better control can be maintained over the cylinder means owing to, for example, the lower compressability of liquids as opposed to gases. By so constructing the blades 44 to move from the second to the first position in contact with the molded article, as described above, the blades 44 function to eject the article in association with ejecting functions performed by the stripping elements 36. By so utilizing the blades 44, the forces required to eject the molded article 1 from the mold are distributed over a larger area of the molded article 1 which reduces the possibility of damage to the article 1 during ejection. As known in the molding art, article ejection without damage is a most difficult problem when molding articles having internal walls and protrusions. This ejection problem is reduced to such an extent by utilizing the blades for ejecting the article that the core elements of this apparatus can have opposed sides that are substantially parallel one to the other for forming an article having protrusions that are substantially parallel and have substantially no draft.

FIGS. 2-5 show the apparatus of this invention, as described with primary reference to FIG. 1, at various operational positions during continuous travel of the mold core section 4 toward the second position.

In the operation of this invention, referring to FIG. 1, a power means (not shown) is applying force through shaft 34 to hold the mold core section 4, the stripping element 36, and the core elements 42 in sealable contact with the mold cavity section 2 and associated tulips 16. The blades 44 of this invention are at the first position within the mold cavity section 2. Plastic molding material is passed through the sprue 12, the runners 14, and into the cavity 8 between the tulip 16, thereby forming the outer shell, for example, of the molded article.

Figure 2:
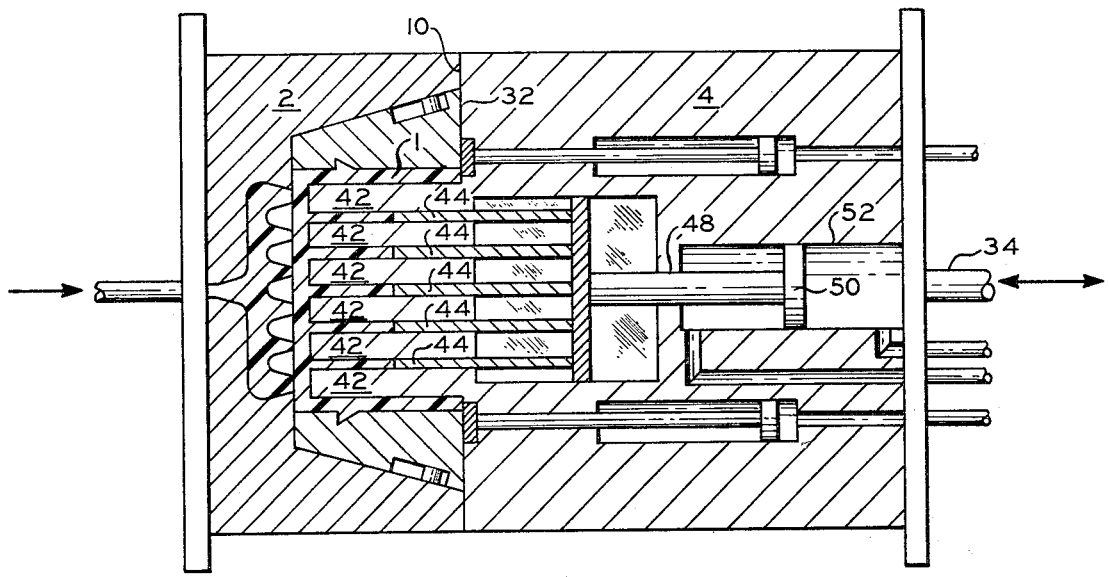
Figure 3:
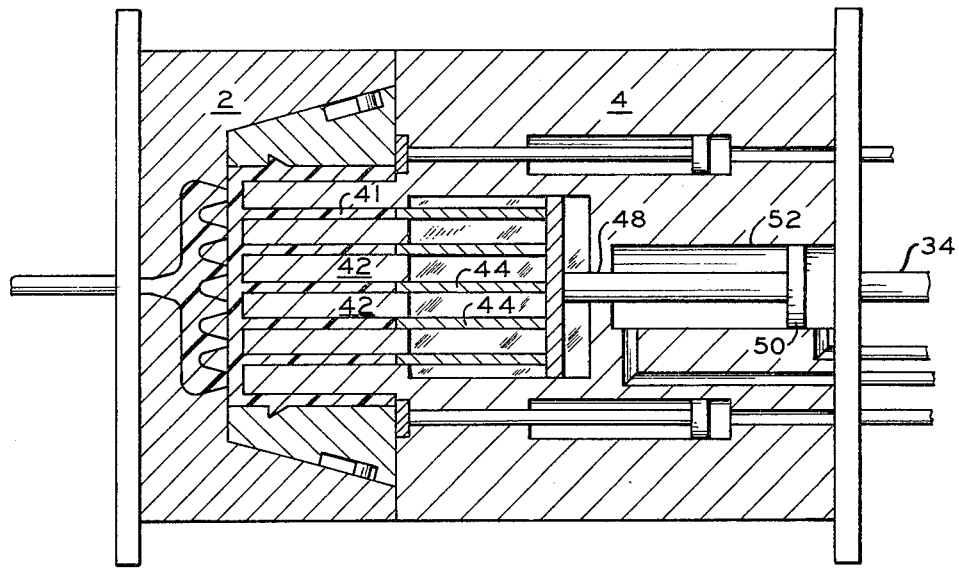

At a predetermined moment, as can be controlled for example by pressure increases, the blades are withdrawn from the mold cavity section 2 at a substantially uniform rate while urging the blades 44 toward the first position for holding pressure against the molding material entering the cavity between the core elements 42 as shown in FIG. 2. After the blades have reached their second position as shown in FIG. 3, the apparatus of this invention is maintained until the plastic material has sufficiently set and the mold can be opened without damage to the article 1. This time period is dependent upon various factors such as the type of plastic material used, the temperature, the pressure, etc. Thereafter, the power source connected to the shaft 34 and the power source connected to the stripping element 36 are energized.

Figure 4:
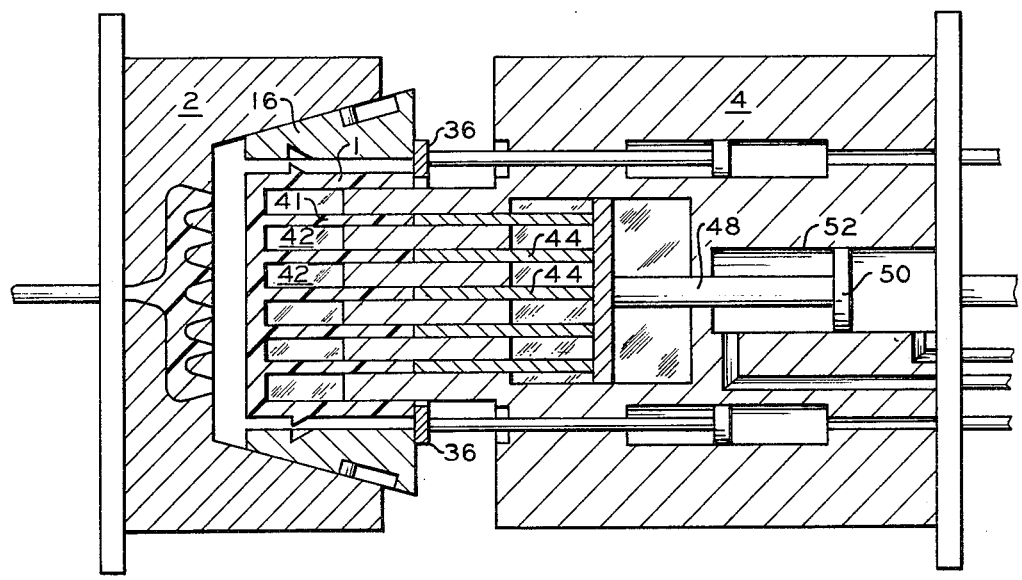

Referring to FIG. 4, the mold core section 4 has been moved from the mold cavity section 2 toward the second position, the tulips 16 have moved to the article-releasing position, and the stripping elements 36 and blades 44 have initiated movement toward their second position thereby initiating ejection of the molded article 1 from the mold.

Referring to FIG. 5, the mold core section 4, the stripping elements 36, and the blades 44 are at their second position and the article 1 has been ejected from the mold. Thereafter the various elements of the apparatus are returned to the position shown in FIG. 1 and a new molding cycle is initiated.

It should be understood that the blades 44 can also be constructed to move a desired distance during injection of a second volume of the molding material as described above less than the distance required for complete removal from the cavity section and thereby form a molded article with protrusions having a length less than the length of the portions of the article formed while injecting a first volume of plastic molding material as described above.

Other modifications and alterations of this invention will become apparent to those skilled in the art from the foregoing discussions and accompanying drawing, and it should be understood that this invention is not to be unduly limited thereto.

I claim:

1. In an injection mold for forming and ejecting a molded plastic article having wall portions and at least one divider portion comprising a mold cavity section and a mold core section having at least two associated core elements, said mold core section and associated core elements being movable between a first position at which the core elements are positioned within the mold cavity section to define the wall cavity and the article is formed and a second position wherein the molded article, mold core section and the core elements are spaced a distance from said mold cavity section and the molded article is ejected from the mold, the improvement comprising:

at least one core blade having a first end portion and a first and second end slidably positioned between adjacent core elements and being movable along the core elements between a first position at which the first end portion is adjacent and separating first ends of the core elements and a second position at which the first end and first end portions of the blades are spaced a distance from the first end of the core elements for forming the divider cavity; and means for moving the at least one blade from the first to the second position in the first position of the mold sections in response to filling of said wall cavity for forming the divider portion of the molded article and from the second to the first position at spaced apart locations of the mold sections for ejecting the molded article from the injection mold.

2. An injection mold, as set forth in claim 1, wherein the means for moving the blades comprises a fluid-actuated, double acting cylinder, a piston within the cylinder, an actuating rod connected to the blades and to the piston, a power source and first and second conduit for movement of fluid between the cylinder and the power source.

3. An injection mold, as set forth in claim 2, wherein the blades are moved from the first to the second position at a uniform rate in response to movement of the piston, said blade movement being initiated at a predetermined moment subsequent to forming a portion of the molded article within the injection mold.

4. An injection mold, as set forth in claim 2, wherein a power source is connected to the mold core section for moving said mold section between a first position wherein the mold section is adjacent and forcefully contacting the mold cavity section and a second position wherein the mold section is spaced from the cavity section a distance sufficient to eject the molded article therebetween and the blades are moved from the second to the first position in contact with the molded article during movement of the mold core section from the first to the second position.

5. An injection mold, as set forth in claim 2, wherein the cylinder is a hydraulically actuated cylinder.

6. An injection mold, as set forth in claim 1, wherein there are a plurality of core elements having a separate blade positioned therebetween adjacent core elements and with the blades connected to the means for moving the blades.

7. An injection mold, as set forth in claim 1, wherein the core elements have opposed sides that are substantially parallel one to the other.

References Cited

UNITED STATES PATENTS

| | | | |
|---|---|---|---|
| 3,166,789 | 1/1965 | Schönenberger | 18—16 F |
| 3,585,690 | 6/1971 | Tucker | 18—42 DX |
| 3,509,603 | 5/1970 | Halsall et al. | 18—DIG. 10 |
| 3,564,660 | 2/1971 | Darnell | 18—42 D |

J. SPENCER OVERHOLSER, Primary Examiner

D. S. SAFRAN, Assistant Examiner

U.S. Cl. X.R.

425—438, 457; 264—328, 334